United States Patent [19]

Rowe

[11] Patent Number: 4,658,252
[45] Date of Patent: Apr. 14, 1987

[54] ENCODER/DECODER FOR CARD ENTRY SYSTEM

[75] Inventor: Don H. Rowe, Portola Valley, Calif.

[73] Assignee: GTE Government Systems Corporation, Stamford, Conn.

[21] Appl. No.: 882,438

[22] Filed: Jul. 7, 1986

Related U.S. Application Data

[63] Continuation of Ser. No. 640,060, Aug. 13, 1984, abandoned.

[51] Int. Cl.$^4$ .............................................. G09C 1/00
[52] U.S. Cl. ........................... 340/825.31; 340/825.34; 235/435; 235/439
[58] Field of Search ........................ 340/825.3–825.39, 340/825.54; 235/435, 439; 343/6.5 R–6.8 LC; 310/313 R, 313 B; 333/193, 150, 30

[56] References Cited

U.S. PATENT DOCUMENTS

| | | | |
|---|---|---|---|
| 3,344,629 | 10/1967 | Burney | 70/280 |
| 3,377,616 | 4/1968 | Auer | 340/825.54 X |
| 3,568,102 | 3/1971 | Tseng | 333/30 |
| 3,706,094 | 12/1972 | Cole et al. | 343/6.55 SS |
| 3,836,876 | 9/1974 | Marshall et al. | 333/30 |
| 4,006,436 | 2/1977 | Heeks | 333/30 |
| 4,058,217 | 11/1977 | Vaughan et al. | 209/11 |

Primary Examiner—Ulysses Weldon
Attorney, Agent, or Firm—Douglas M. Gilbert

[57] ABSTRACT

A surface acoustic wave (SAW) filter device configured as a tapped time delay is mounted on a plastic card. The SAW filter acts as a nondestructive storage medium for an identification code in an access control system. The identification code is imbedded in the SAW device by selectively connecting certain taps to the filter output terminals. The identification code is read out of the SAW filter device and decoded for verification of the code. To read the code a sweep frequency oscillator excites the filter to launch an acoustic wave. The filter ouput mixes with the input sweep signal and the lower sideband ($f_b-f_a$) is extracted to obtain a discrete line spectra each line representing the connected tap of the filter. The line spectra signal is mixed with another version of the input sweep signal to obtain a time-based amplitude response of the discrete line spectra. This analog signal is converted to a digital signal which corresponds to the binary code of the connections to the SAW filter.

22 Claims, 6 Drawing Figures

ENCODER/DECODER FOR CARD ENTRY SYSTEM

RELATED APPLICATION

This is a continuation of co-pending application Ser. No. 640,060, filed on Aug. 13, 1984, now abandoned, "AN ACCESS CONTROL CARD ENTRY SYSTEM USING AN ENCODED SURFACE ACOUSTIC WAVE DEVICE;" and related to application Ser. No. 640,267, filed Aug. 13, 1984, entitled "DECODING APPARATUS FOR READING A BINARY CODE ENCODED IN A TAPPED DELAY-LINE FILTER," now abandoned.

BACKGROUND OF THE INVENTION

This invention relates to an improved card based access control system and more particularly, to an access control system utilizing an encoded acoustic wave device in a wallet-size pass card; and, a mechanism for decoding the device.

All access control systems perform the fundamental process of verifying the eligibility of an individual seeking access to some restricted area. There are many techniques and devices used to attain various degrees of security. Many of these systems are card based and having a unique personal identification number encoded on the card itself. The most common cards are embossed plastic cards or plastic cards with magnetic tape (or a combination of both). Other less common cards are punched cards, electric circuit cards, differential optics cards, copper strip cards, and capacitance cards.

There are advantages and disadvantages to all such card-based systems. Besides obvious economic considerations, there are other important factors to consider in selecting a card entry system, such as, ease of duplicating or forging cards, number of unique ID codes possible, ease of encryption, reliability, durability and speed of operation.

Surface acoustic wave (SAW) devices configured as a tapped delay line could be used as the storage mechanism for an ID number. Such a device placed on a wallet-size plastic card would possess many desireable features if used in combination with an appropriate card reader device. Such a SAW device easily could store 30 bits of binary code in a very small area and thus accomodate a large number of potential users ($2^{30}$ in excess of 1 billion). It would be difficult to counterfeit or duplicate existing cards, and a SAW device card would appear to possess other basic requirements of a card based system.

OBJECTS AND SUMMARY OF THE INVENTION

It is an object of the invention to imbed a binary ID code on a wallet-size key card using a surface acoustic wave (SAW) filter as the storage mechanism.

It is yet another object of the invention to provide an economical decoder mechanism for extracting an ID code imbedded in a SAW device.

It is yet another object of the invention to provide a decoder mechanism that will reliably extract the ID code imbedded in a SAW device.

These and other objects of the invention are accomplished with a card or badge device in which an identification code is imbedded in SAW device tapped delay line having a plurality of delay line taps. The ID code is stored in the device by connecting selected delay-line taps to an output line. The ID code is read out of the SAW filter device and decoded for verification of the ID code. To read the code a sweep frequency oscillator excites the filter to launch an acoustic wave. The filter output signals mix with the input sweep signal and the lower sideband ($f_b - f_1$) is extracted to obtain a discrete line spectra corresponding to the connected taps of the filter. The discrete line spectra signal is mixed with a down converted version of the input sweep signal to obtain a time-based amplitude response of the discrete line spectra. This analog signal is converted to a digital signal which corresponds to the binary code of the connections to the SAW filter.

DETAILED DESCRIPTION

Figure 1:
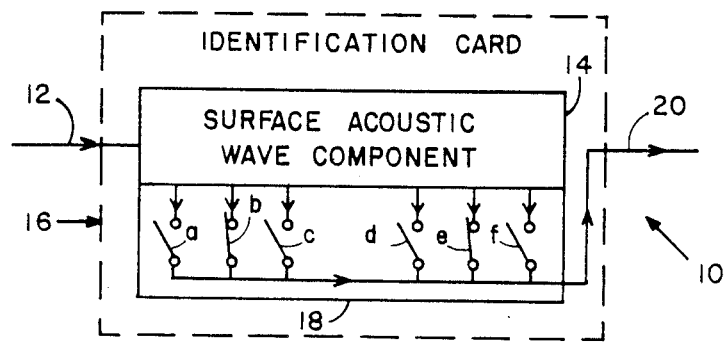
FIG. 1 is a block diagram of an identification card including a surface acoustic wave component such as may be used for imbedding said code.

FIG. 1 depicts a plastic card 10 which could be used for identification purposes in an access control system. Mounted on the card is a surface acoustic wave (SAW) filter 14 having an input contact 12 and an output contact 20. SAW filter 14 is a conventional interdigitated comb-like electrode structure fabricated on the surface of a piezoelectric substrate. This particular SAW filter structure is designed to effect a tapped electrical delay line.

Operationally high frequency signals (VHF or above) applied to the input transducer through contact 12 launch acoustic surface waves in the substrate orthongonally to the electrode structure. The surface waves are converted back into electromagnetic signals by a similar electrode array transducer at the filter output. The output signal at any intermediate electrode tap is a delayed replica of the input signal. However, the amplitude of the output signal is reduced compared to the amplitude of the input signal.

One of numerous advantages of using a SAW device as the code storage mechanism is that as many as 50 delay line taps are readily obtainable in a small device. Certainly there are many different SAW filter designs that could be used to effect such a tapped delay line filter. Whatever the design, the electrodes preferrably should be spaced so that the time delay between each delay line tap is approximately the same. These taps are depicted in FIG. 1 as simply toggle switches a-f as an aid in explaining the operation of the decoder mechanism.

During fabrication of the SAW filter, a binary code may be imbedded in the device by connecting one or more taps (16) to path 18. Considering an open tap as a binary 0 and a connected tap as a binary 1, the taps shown as a, b, c, d, e and f in FIG. 1 provide the following identification code: 010011. The ability to imbed such an identification code during fabrication of the SAW device is of significance only where there is an efficient technique for sensing the code and converting it into an output signal that may be used to effect the desired recognition signal. Apparatus to decode the SAW device is shown in the block diagram in FIG. 6.

Figure 6:
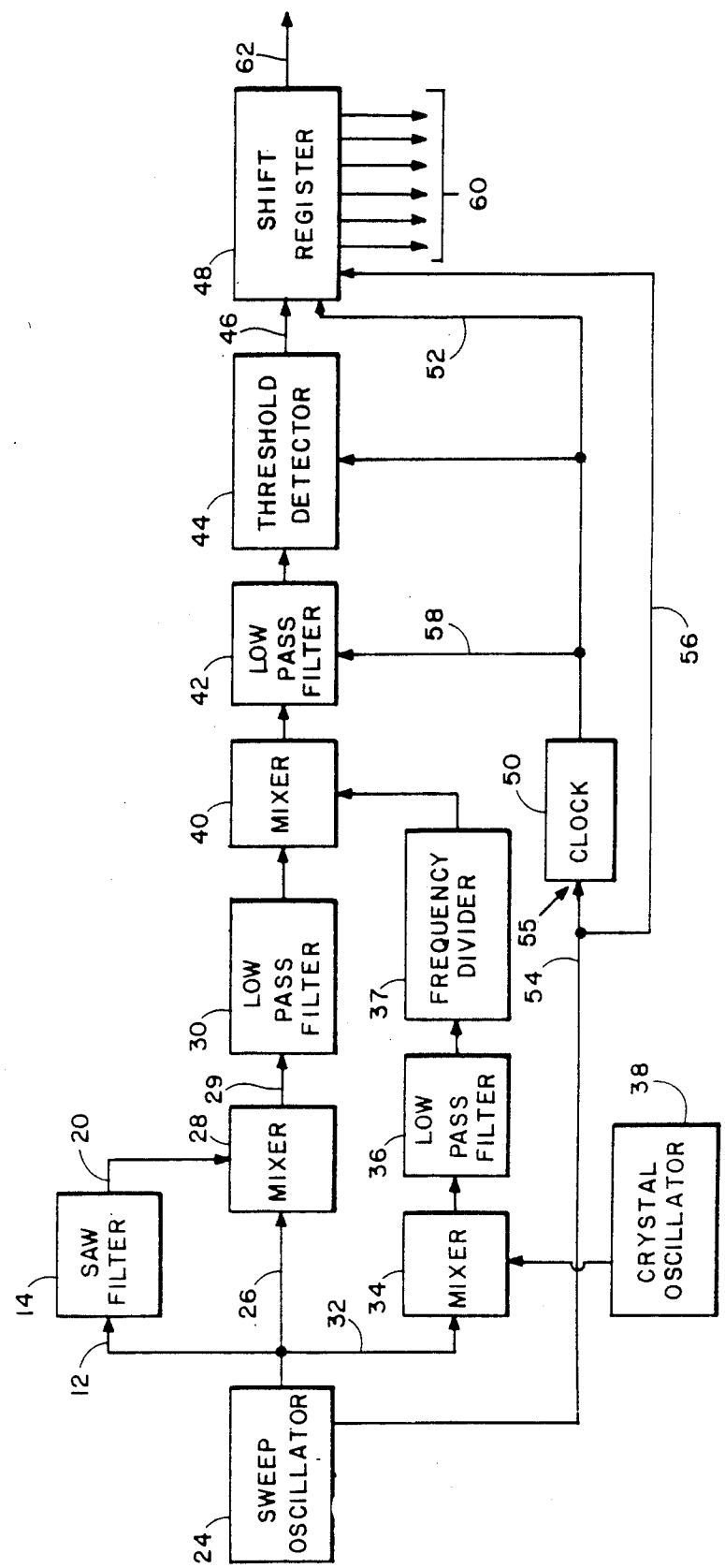
FIG. 6 is a schematic diagram illustrating how the code imbedded in said card is converted into a binary code signal representative of the imbedded code.

Referring to FIG. 6, sweep oscillator 24 generates a sinusoidal output signal 22 that varies linearly in frequency across the passband of the SAW filter 14. (In one embodiment, the SAW filter has a 410 MHz center frequency, a 20 MHz bandwidth, and a maximum time delay of 3.3 microseconds. The sweep oscillator 24 is set to sweep between 400 MHz and 440 MHz in 6.6 microseconds with a blanking period of approximately 100 milliseconds.) In order to ease the long term frequency stability requirements of the sweep oscillator, it may be advantageous to phase-lock a crystal oscillator to the oscillator during the (100 milliseconds) blanking period. This assures that the 6.6 microseconds sweep from 400 to 440 MHz will always start at exactly the crystal oscillator frequency (400 MHz). Not all applications of the decoder will require the use of the phase-locked loop 23 as shown in FIG. 6. The sweep oscillator 24 also generates a second output signal on path 54 that provides a reset pulse to trigger various circuits upon the start of each frequency sweep.

Figure 2:
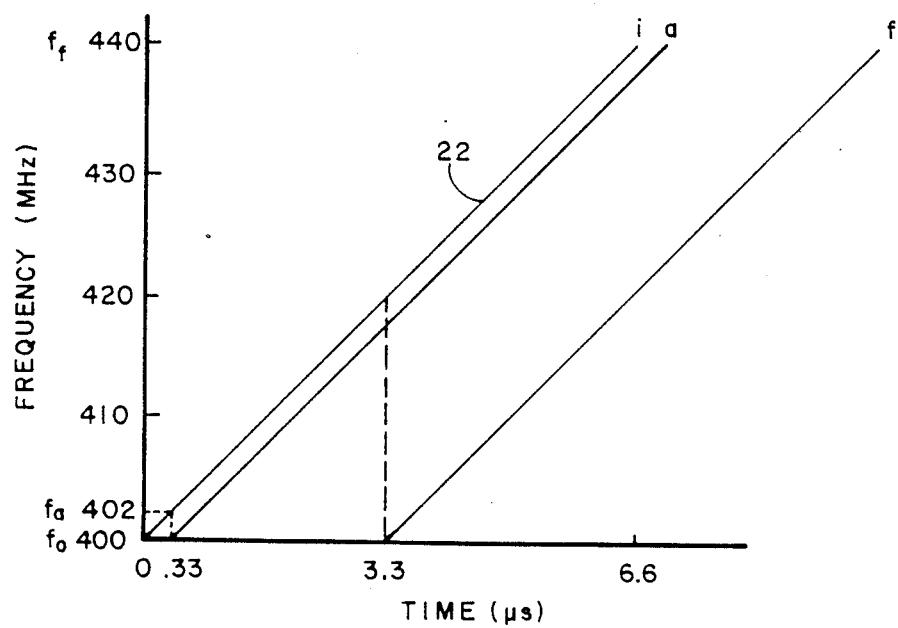
FIG. 2 is a diagram which graphically illustrates the frequency relationship of the SAW filter taps.
Figure 3:
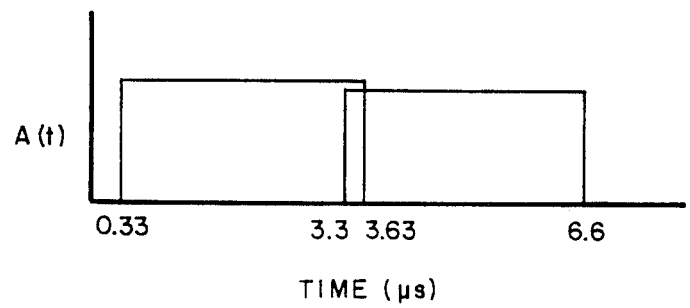
FIG. 3 is a signal diagram illustrating one example of the waveforms at an intermediate point in the decoder circuit.

As may be understood from the graph of FIG. 2. the sweep oscillator 24 periodically generates a swept-frequency signal that sweeps linearly from $f_o$ to $f_f$, (400 MHz to 440 MHz in the example herein) which is applied to the input contact 12 of the SAW filter 14. When the filter input is swept, the frequency of the signal at each connected tap differs from the frequency of the input signal by a fixed amount—the amount being a function of the amount of time delay at the particular tap and the sweep rate of the oscillator. Thus when the ramp frequency is at $f_a$ (402 MHz) the frequency at tap a is at $f_o$ (400 MHz). In other words at each tap there is a delayed replica of the filter input signal.

As shown in FIG. 6, sweep oscillator 24 generates a sweep output signal that is applied to the SAW filter 14 and to the inputs of mixers 28 and 34. (Mixers 28, 34, and 40 are a type of heterodyne modulator that produce a frequency mixing of the input signals i.e., $f_a + f_b$ and $f_a - f_b$.) The SAW filter output connects via path 20 to a second input of mixer 28. Mixer 28 generates on path 29 the sum and difference frequencies of the input signals on paths 20 and 26. The difference frequency signal passes through low pass filter 30 to one input of mixer 40. The second input to mixer 40 comes from the output of mixer 34 through low pass filter 36 and frequency divider 37.

Figure 4:
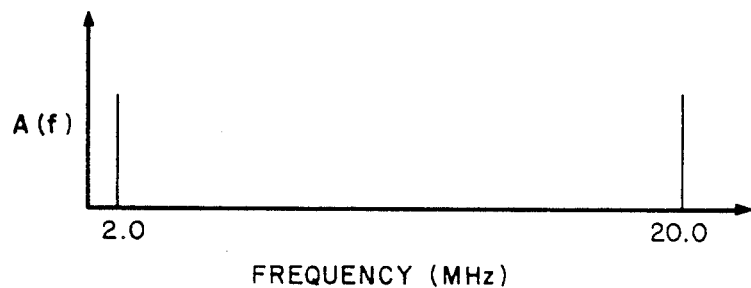
FIG. 4 is a frequency diagram illustrating one example of the frequency spectrum at an intermediate point in the decoder circuit.

The spectral distribution of the output signal from low pass filter 30 appears in FIG. 4. The first frequency line at 2.0 MHz results from tap a being connected, and the second frequency line at 20 MHz results from tap f being connected. For the particular sweep rate shown in FIG. 2, tap a provides an output signal whose frequency is 2.0 MHz below the frequency of input signal "i", and similarly tap f provides an output signal whose frequency is 20 MHz below the frequency of the input signal "i" i.e. $f_i - f_a = 2.0$ MHz and $f_i - f_f = 20$ MHz. The frequency sum components $f_i + f_a$ and $f_i + f_a$ are rejected by the low pass filter 30, and the difference frequency components are conducted to mixer 40.

Figure 5:
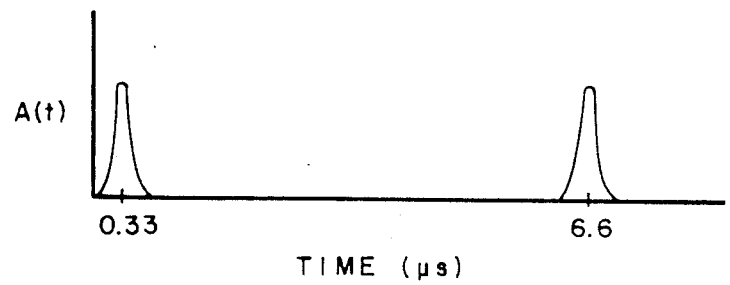
FIG. 5 is a signal diagram illustrating one example of the waveforms at any intermediate point in the decoder circuit.

Referring again to FIG. 6, the sweep frequency output on path 32 mixes with the reference oscillator frequency of 400 MHz from crystal oscillator 38 to provide a 0 to 40 MHz and 800 MHz to 840 MHz sweep output signal. The 0 to 40 MHz sweep signal passes through low pass filter 36 and on to a frequency divider 37. In this case the divider will divide the frequency in half and provide a sweep frequency from 0 to 20 MHz as one input to mixer 40. Mixer 40 in combination with low pass filter 42 is occasionally referred to as a "zero IF" superheterodyne receiver. Mixer 40 sweeps the output from low pass filter 30 to produce the sum and difference frequencies of the input signals. (The sum frequency signals are blocked by the low pass filter 42.) The difference frequency signals are only partially transmitted through lowpass filter 42. The signals present at the output of the low pass filter are essentially zero beats for each frequency present. In other words, as the 0 to 20 MHz, 6.6 microsecond signal sweeps through the frequency of the discrete line spectra (shown in FIG. 4) a "zero bear" signal is produced. To pick off only the zero beat signals, a low pass filter having a 250 kHz cutoff frequency is used. At the output of low pass filter 42, a single pulse appears for each connected tap. In the example chosen, (taps a and f connected) there are two ("zero beat") pulses, as shown in FIG. 5; one 0.33 microseconds from the start of the sweep and one 6.6 microseconds from the start of the sweep. Mixer 40 and low pass filter 42 convert what is a frequency-domain signal (FIG. 4) into a time-domain signal (FIG. 5).

There are a couple of design considerations in selecting the cutoff frequency of low pass filter 42. The filter pass band must be low enough to distinguish between adjacent pulses. In the example chosen, adjacent SAW filter taps, when swept, generate spectral lines 667 kHz apart. Therefore, filter 42 was selected to have a 250 kHz cutoff frequency. Conversely too low a cutoff frequency produces a zero beat pulse of very low level, which is difficult to distinguish from background circuit noise.

Clock generator 50 (set to pulse every 0.22 microseconds for the example chosen) triggers threshold detector 44 to measure the input voltage at the exact time interval that a pulse from low pass filter 42 could be present. Any voltage above a preset threshold causes a binary 1 to appear on path 46, and any voltage below the threshold causes a binary 0 to appear on path 46. (The reset pulse on path 54 applied to reset input 55 causes the clock generator 50 to recycle at the start of each sweep interval.) Threshold detector 44 sequentially clocks the binary 1/0 pattern into shift register 48 which stores the code for parallel or serial readout via path 60 or 62 respectively. Shift register 48 writes the ID code out and clears upon the start of each new sweep. Proper timing for this operation is accomplished with a reset signal via path 56 and clock pulses via path 52.

Validation of the output code on either path 60 and 62 may be accomplished with a mechanism which will accept or reject the individual card depending upon whether the imbedded code is an authorized code for access as requested. There are innumerable techniques that perform such comparisons.

What is claimed is:

1. In an access control card entry system, apparatus for storing binary identification key codes and for recovering such key codes, said apparatus comprising:

a surface acoustic wave (SAW) delay line device mounted on a control card, said device having an input terminal, an output terminal and a plurality of delay line taps, for imbedding a binary identification key code therein by connecting selected ones of said taps to said output terminals;

frequency generating means having an output terminal connected to said input terminal of said SAW device, for generating a periodic swept frequency signal varying in frequency from $f_o$ to $f_f$ and including at least the operating frequency range of said SAW device;

oscillator means having an output, said oscillator means for providing a frequency reference signal of frequency $f_o$;

a first, second, and third frequency conversion means, each having first and second inputs and an output for generating an output signal whose frequency is equal to at least the difference in frequency of signals applied to said first and second inputs;

said first input of said first frequency conversion means connected to said SAW output terminal, said second input of said first frequency conversion means connected to said output terminal of said frequency generating means, for producing a periodic output signal having a unique frequency component corresponding to each connected tap of said SAW device;

said first input of said second frequency conversion means connected to said output terminal of said frequency generating means and said second input of said second frequency conversion means connected to said output of said oscillator means, said second frequency conversion means for down converting the frequency of said periodic swept frequency signal;

said first input of said third frequency conversion means connected to said output of said first frequency conversion means, and said second input of said third frequency conversion means connected to said output of said second frequency conversion means, said third frequency conversion means for generating a periodic pulse waveform with each pulse corresponding to said selected ones of said taps and said pulse waveform having a timed relationship between pulses corresponding to the time delay between said selected ones of said taps;

means for detecting the presence or absence of pulses in said periodic pulse waveform at each interval of time corresponding to the interval of time between adjacent time delay taps, and means for generating a binary pulse signal corresponding to said binary code.

2. Apparatus as in claim 1 wherein said first frequency conversion means further includes a first low pass filter means to block frequencies substantially above $f_f-f_o$.

3. Apparatus as in claim 2 wherein said second frequency conversion means further comprises:
a second a low pass filter means to block frequencies substantially above $f_f-f_o$, and
dividing means operatively coupled to a said second low pass filter means for dividing the frequency of the output of said second frequency conversion means.

4. Apparatus as in claim 3 wherein said third frequency conversion means further includes a third low pass filter means having a pass band below $(1/n)(f_f-f_o)$ where n=the number of taps on said SAW device.

5. Apparatus as in claim 4 wherein said means for detecting the presence or absence of pulses in said periodic pulse waveform comprises:
threshold detector means for generating a binary 1 when the pulse amplitude of said third frequency conversion means is above a predetermined threshold voltage and for generating a binary 0 when the pulse amplitude of said third frequency conversion means is below a predetermined threshold voltage; and
timing means operatively connected to said threshold detector means for controlling the instants of time said threshold detector means determines the presence or absence of pulses in said periodic pulse waveform.

6. Apparatus as in claim 5 wherein said means for generating a binary pulse signal corresponding to said binary code comprises a shift register means operatively connected to said threshold detector means and to said timing means, said shift register means writing out said binary pulse signal after each sweep frequency interval of said frequency generating means.

7. Apparatus as in claim 6 wherein said frequency generating means comprises a sweep oscillator.

8. Apparatus as in claim 1 wherein said SAW device includes a SAW filter wherein said plurality of delay line taps are spaced so that the time delay between adjacent taps is equal.

9. In a system including a SAW tapped delay line having an input, an output, and a plurality of delay-line taps, decoder apparatus for identifying which taps are connected to the SAW delay-line output comprising:
frequency generating means having a first output terminal for connection to said SAW input, for generating a periodic swept frequency signal varying in frequency from $f_o$ to $f_f$ and including at least the operating frequency range of said SAW delay line;
oscillator means having a second output terminal, said oscillator means for providing a frequency reference signal of frequency $f_o$;
first frequency conversion means having first and second input terminals and a third output terminal, said first input terminal for connection to said SAW output, said second input terminal connected to said first output terminal, said conversion means for generating an output signal whose frequency is equal to the difference in frequency of signals applied to said first and second input terminals, thereby producing a periodic output signal having a unique frequency component corresponding to each connected tap of said SAW delay line;
second frequency conversion means having third and fourth input terminals and a fourth output terminal, said third input terminal connected to said first output terminal, said fourth input terminal connected to said second output terminal, said conversion means generating an output signal whose frequency is equal to the difference in frequency of signals applied to said third and fourth input terminals, and thereby frequency down converting said periodic swept frequency signal;
third frequency conversion means having fifth and sixth input terminals and a fifth output terminal, said fifth input terminal connected to said third output terminal, said sixth input terminal connected to said fourth output terminal, said conversion means generating an output signal whose frequency is equal to the difference in frequency of signals applied to said fifth and sixth input terminals, and thereby generating a periodic pulse waveform in which each pulse therein corresponds to each connected tap and said pulses therein having a timed relationship corresponding to the time delay between said connected taps;

means for detecting the presence or absence of pulses in said periodic pulse waveform at each interval of time corresponding to the interval of time between adjacent time delay taps, and means for generating a binary pulse signal corresponding to the exact sequence of taps that are connected and unconnected.

10. Apparatus as in claim 9 wherein said first frequency conversion means further includes a first low pass filter means to block frequencies substantially above $f_f - f_o$.

11. Apparatus as in claim 10 wherein said second frequency conversion means further comprises:
a second a low pass filter means to block frequencies substantially above $f_f - f_o$, and
dividing means operatively coupled to a said second low pass filter means for dividing the frequency of the output of said second frequency conversion means.

12. Apparatus as in claim 11 wherein said third frequency conversion means further includes a third low pass filter means having a pass band below $(1/n)(f_f - f_o)$ where n = the number of taps on said SAW device.

13. Apparatus as in claim 12 wherein said means for detecting the presence or absence of pulses in said periodic pulse waveform comprises:
threshold detector means for generating a binary 1 when the pulse amplitude of said third frequency conversion means is above a predetermined threshold voltage and for generating a binary 0 when the pulse amplitude of said third frequency conversion means is below a predetermined threshold voltage; and
timing means operatively connected to said threshold detector means for controlling the instants of time said threshold detector means determines the presence or absence of pulses in said periodic pulse waveform.

14. Apparatus for identifying a binary code encoded in a tapped delay line filter, said filter having an input terminal, an output terminal and a plurality of delay-line taps for encoding a binary code therein, by connecting selected taps to the output terminal, said apparatus comprising:
frequency generating means having an output terminal connected to said input terminal of said delay line filter for generating a periodic first swept frequency signal varying in frequency from $f_o$ to $f_f$ and including the operating frequency range of said delay line filter;
oscillator means having an output, said oscillator means for providing a frequency reference signal of frequency $f_o$;
a first, second, and third frequency conversion means, each having first and second inputs and an output for generating an output signal whose frequency is equal to at least the difference in frequency of signals applied to said first and second inputs, said first input of said first frequency conversion means connected to said delay line filter output terminal, said second input of said first frequency conversion means connected to said output terminal of said frequency generating means, for producing a periodic output signal having a unique frequency component corresponding to each connected tap of said delay line filter;

said first input of said second frequency conversion means connected to said output terminal of said frequency generating means and said second input of said second frequency conversion means connected to said output of said oscillator means, said second frequency conversion means for down converting the frequency of said first periodic swept frequency signal;

said first input of said third frequency conversion means connected to said output of said first frequency conversion means, and said second input of said third frequency conversion means connected to said output of said second frequency conversion means, said third frequency conversion means for generating a periodic pulse waveform with each pulse corresponding to said selected ones of said taps and said pulse waveform having a timed relationship between pulses corresponding to the time delay between said selected ones of said taps;

means for detecting the presence or absence of pulses in said periodic pulse waveform at each interval of time corresponding to the interval of time between adjacent time delay taps, and means for generating a binary pulse signal corresponding to said binary code.

15. Apparatus as in claim 14 wherein said first frequency conversion means further comprises a first low pass filter means to block frequencies substantially above $f_f - f_o$.

16. Apparatus as in claim 15 wherein said second frequency conversion means further comprises:
a second a low pass filter means to block frequencies substantially above $f_f - f_o$, and dividing means operatively coupled to a said second low pass filter means for dividing the frequency of the output of said second frequency conversion means.

17. Apparatus as in claim 16 wherein said third frequency conversion means further comprises a third low pass filter means having a passband below $(1/n)(f_f - f_o)$ were n = the number of taps on said delay-line filter.

18. Apparatus as in claim 17 wherein said means for detecting the presence or absence of pulses in said periodic pulse waveform further comprises:
threshold detector means for generating a binary 1 when the pulse amplitude of said third frequency conversion means is above a predetermined threshold voltage and for generating a binary 0 when the pulse amplitude of said third frequency conversion means is below a predetermined threshold voltage; and
timing means operatively connected to said threshold detector means for controlling the instants of time said threshold detector means determines the presence or absence of pulses in said periodic pulse waveform.

19. Apparatus as in claim 18 wherein said means for generating a binary pulse signal corresponding to said binary code comprises a shift register means operatively connected to said threshold detector means and to said timing means, said shift register means writing out said binary pulse signal after each sweep frequency interval of said frequency generating means.

20. Apparatus as in claim 19 wherein said frequency generating means comprises a sweep oscillator.

21. Apparatus as in claim 14 wherein said tapped delay-line filter comprises a SAW device mounted on a plastic card.

22. Apparatus for identifying a binary code encoded in a tapped delay line filter, said filter having an input terminal, an output terminal and a plurality of delay-line taps for encoding a binary code therein by connecting selected taps to the output terminal, said apparatus comprising:

sweep frequency oscillator having a first output terminal for connection to said input of said delay-line filter for generating a periodic first swept frequency signal varying in frequency from $f_o$ to $f_f$ and including the operating frequency range of said delay-line filter;

oscillator means having a second output terminal, said oscillator means for providing a stable reference frequency signal of frequency $f_o$;

first mixer means having first and second input terminals and a third output terminal, said first input terminal for connection to said delay-line filter output, said second input terminal connected to said first output terminal, said mixer means for generating an output signal whose frequency is equal to the sum and difference in frequency of signals applied to said first and second input terminals;

first filter means having a third input terminal and a fourth output terminal, said third input terminal connected to said third output terminal, said filter means for blocking frequencies above $2f_o$ thereby producing a periodic output signal having a unique frequency component corresponding to each connected tap of said delay-line filter;

second mixer conversion means having fourth and fifth input terminals and a sixth output terminal, said fourth input terminal connected to said first output terminal, said fifth input terminal connected to said second output terminal, said conversion means for generating an output signal whose frequency is equal to the sum and difference in frequency of signals applied to said fourth and fifth input terminals;

second filter means having a sixth input terminal and a seventh output terminal, said sixth input terminal connected to said sixth output terminal, said filter means for blocking frequencies above $2f_o$ thereby conducting a 0 to $(f_f - f_o)$ periodic swept frequency signal to said sixth output terminal;

frequency divider means having a seventh input terminal and an eighth output terminal, said seventh input terminal connected to said seventh output terminal, said divider means for dividing in half the frequency of signals applied to said seventh input terminal;

third mixer means having eighth and ninth input terminals and a ninth output terminal, said eighth input terminal connected to said eighth output terminal, said ninth input terminal connected to said fourth output terminal, said mixer means generating an output signal whose frequency is equal to the sum and difference in frequency of signals applied to said eighth and ninth input terminals;

third filter means having a tenth input terminal and a tenth output terminal, said tenth input terminal connected to said ninth output terminal, said filter means generating a periodic pulse waveform in which each pulse therein corresponds to each connected tap and said pulses therein having a timed relationship corresponding to the time delay between said connected taps;

means for detecting the presence or absence of pulses in said periodic pulse waveform at each interval of time corresponding to the interval of time between adjacent time delay taps, and means for generating a binary pulse signal corresponding to the exact sequence of taps that are connected and unconnected.

* * * * *